March 22, 1932. R. A. GORSUCH 1,850,347
CHICKEN BROODER
Filed Nov. 15, 1929 2 Sheets-Sheet 1
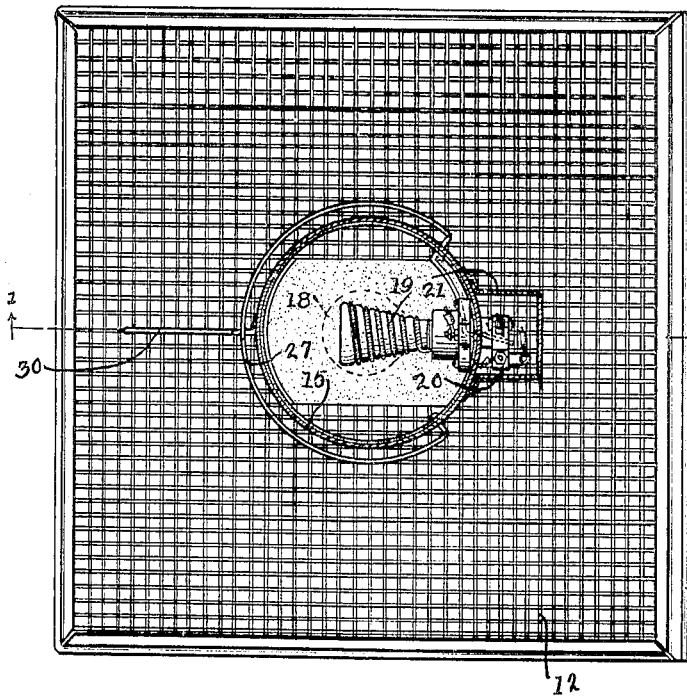
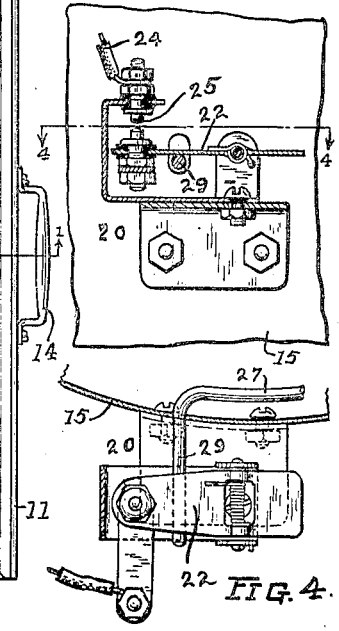
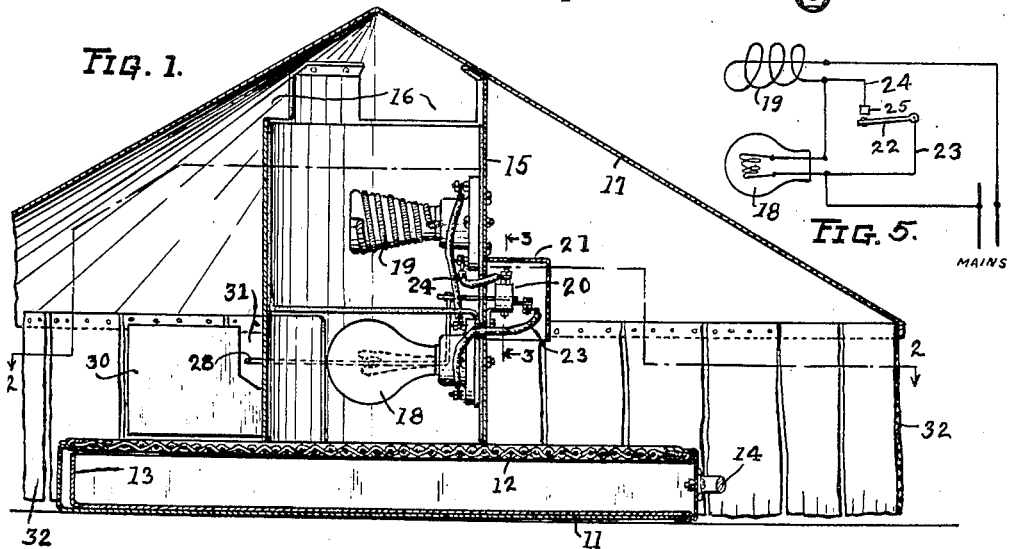
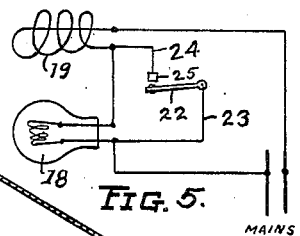
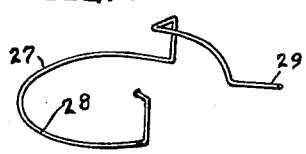
INVENTOR
Robert A. Gorsuch.
BY Hull, Brock and West,
ATTORNEY March 22, 1932.  R. A. GORSUCH  1,850,347
CHICKEN BROODER
Filed Nov. 15, 1929   2 Sheets-Sheet 2
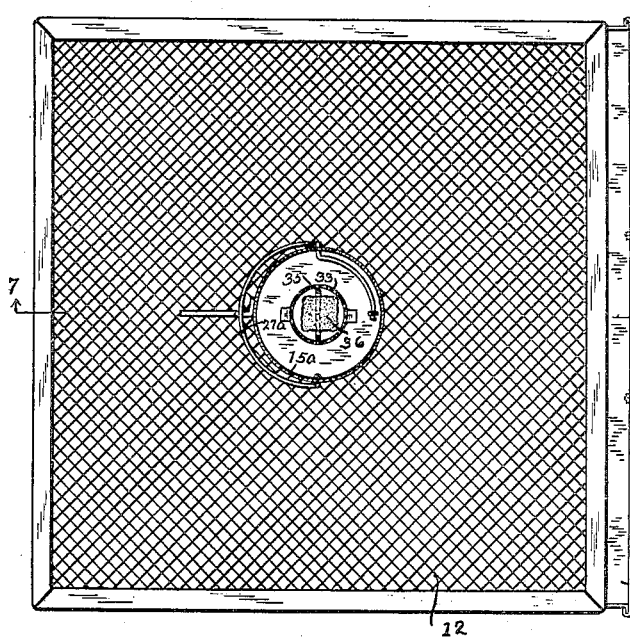
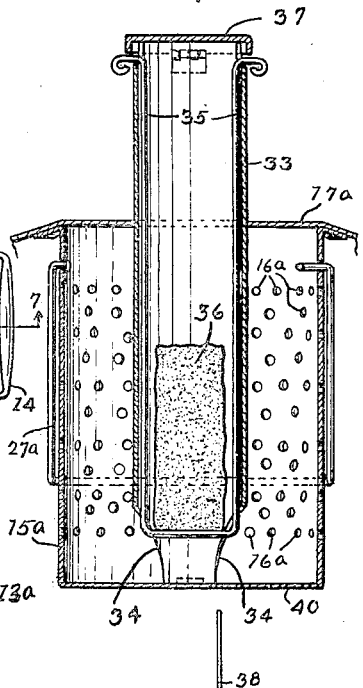
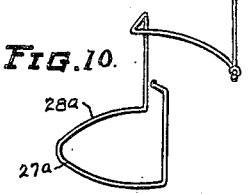
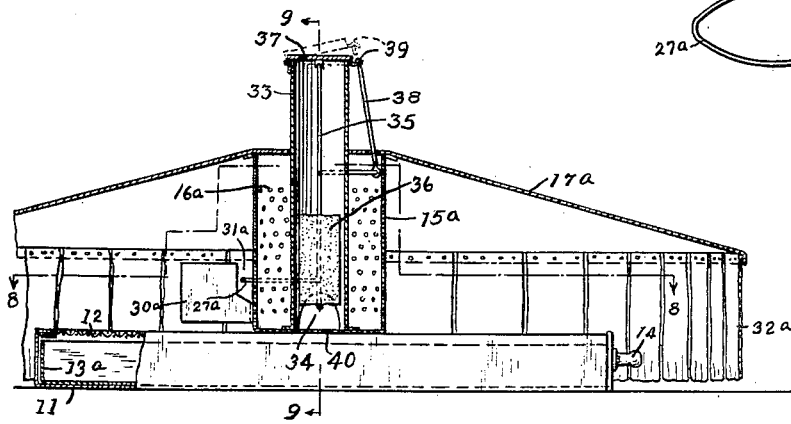
INVENTOR
Robert A. Gorsuch.
BY
Hull, Brock and West.
ATTORNEY Patented Mar. 22, 1932

1,850,347

UNITED STATES PATENT OFFICE

ROBERT A. GORSUCH, OF GAMBIER, OHIO

CHICKEN BROODER

Application filed November 15, 1929. Serial No. 407,320.

This invention relates to chick brooders and more particularly to improvements in heat controls for regulating the air temperature in brooders.

An important object of this invention is to provide a heat control means which is operated by the chicks themselves when they are seeking heat to cause the heating means to operate, and to cause the heating means to be shut off when the chicks are warm.

Another object of the invention is to provide a simple, durable and reliable automatic heat control means which is operated by the chicks themselves, while another object is to provide a heat control means which requires practically no attention from the operator after it is once set in operation.

Still other objects of my invention are to provide a simple heat control means which may be readily installed on existing brooders, and to provide a means for economizing in fuel consumption by causing the heating means to be turned off when the chicks need no artificial heat.

The foregoing objects with others that will appear as I proceed to describe the invention in detail, are attained in the construction illustrated in the accompanying drawings wherein:

Fig. 1 is a central vertical section of the preferred form of this illustrative embodiment of my invention, taken on the line 1—1 of Fig. 2;

Fig. 2 is a section on the line 2—2 of Fig. 1;

Fig. 3 is a vertical section through the switch means taken on the line 3—3 of Fig. 1;

Fig. 4 is a sectional plan view taken on the line 4—4 of Fig. 3;

Fig. 5 is a diagram of the electrical system;

Fig. 6 is an elevation of the mechanism for operating the switch means;

Fig. 7 is a central vertical section of a modified form of my invention taken on the line 7—7 of Fig. 8;

Fig. 8 is a section taken on the line 8—8 of Fig. 7;

Fig. 9 is a vertical section taken on the line 9—9 of Fig. 7; while

Fig. 10 is an elevation of the mechanism for actuating the heater means control.

In caring for newly hatched chicks in a brooder, it is essential that the temperature of the air therein shall be maintained at the temperature which will be most conducive to the proper growth and development of the chicks, and this temperature should be maintained substantially constant regardless of climatic changes, and furthermore, the temperature suitable for chicks varies as the chicks grow older. Chicks require less heat several weeks after they are hatched than they do at the time they are hatched. There are various types of heaters known and used for poultry brooders to maintain a definite predetermined temperature within the brooder by means of thermostatic controls or otherwise. However, so far as I am aware none of the brooder heaters now known or used provide means operated by the chicks for varying the temperatures within the brooder.

I have found that the chicks themselves may be relied upon to control the temperature best suited for their development. Chicks when cold will huddle close to the source of heat and, with this fact in mind, I have designed the heat control so as to be operated by the chicks.

In the preferred embodiment of my invention as disclosed in Figs. 1 through 6, I show a base 11, supporting a wire screen 12 on the top thereof, and forming a frame for supporting a dropping pan 13 which is fitted into the frame so that it slides longitudinally therein, while a handle 14 provides a convenient means for removing the dropping pan 13. A cylindrically shaped heating member 15 suitably mounted on the wire screen 12 is provided at its top with ventilation apertures 16 and supports a substantially conical cover 17 supported thereon in any suitable manner and provided at its lower edge with a felt curtain 32 for retaining the heat within the brooder. An electric light bulb 18 is suitably secured to the inner surface of the heating member 15 near the lower end thereof, while an electric heating element 19 is similarly secured and arranged somewhat above the electric light bulb 18. A diagram of the electrical circuits is clearly shown in Fig. 5. Intermediate the electric light bulb 18 and the electric heating element 19, a switch 20 is secured to the outside of the heating member 15 which is enclosed within a housing 21. A movable contact arm 22 of the switch 20 is connected to a conductor 23 leading from one terminal of the electric light bulb 18, and a fixed terminal 25 of the switch means 20 is connected to a conductor 24 leading to one terminal of the heating element 19.

The actuating mechanism for operating the movable contact arm 22 to cause it to contact the fixed terminal 25 and close the circuit between the conductors 23 and 24 is clearly shown in Fig. 6, and comprises a bell crank lever 27 having a semi-circular section 28 extending partially around the outside of the heating member 15 and spaced a short distance therefrom. The bell crank 27 is disposed near the bottom of the heating member 15 at such a height as to be operated by the chicks and is pivotally mounted in apertures in the sides of the heating member 15 and has a switch operating arm 29 extending through an aperture in the side of the heating member 15 for raising the movable contact arm 22 of the switch when the semi-circular section of the bell crank lever 27 is pressed toward the sides of the heating member 15. A small vertically extending partition 30 is secured to the outside of the heating member 15 at the bottom thereof and is provided with a slot 31 permitting free movement of the semi-circular section 28 of the bell crank lever 27. The partition 30 extends outwardly from the sides of the heating member 15 and is positioned centrally of the ends of the semi-circular section 28 of the bell crank lever 27 and its intersection with the sides of the heating member 15 forms two corners. The chicks' natural instinct of huddling towards a source of heat will attract them to huddle in these corners and against the semi-circular section 28 of the bell crank lever 27 to thus actuate it and thereby cause additional heat to be provided.

In Figs. 7 to 10, I show a modified form of my invention which is particularly adapted for using any well-known combustible material as a heating medium, such as charcoal. A cylindrically shaped heating member 15$^a$ having a bottom 40 is suitably secured on the wire screen 12 and is provided with a plurality of small ventilating apertures 16$^a$. A substantially dish-shaped cover 17$^a$ is suitably mounted on the top of the heating member 15$^a$ and is provided centrally with an aperture through which a chimney 33 positioned centrally within the heating member 15$^a$ projects. The chimney 33 is secured to the bottom of the heating member 15$^a$ and has ventilation slots 34 provided at its lower end, while a substantially U-shaped wire frame 35 depending from the top end 33 is adapted to support a combustible material therein shown as a piece of charcoal 36. A hinged chimney cover 37 is mounted at the top of the chimney 33 and is provided with an extending arm 39 extending outwardly from the cover at the side opposite the hinge so that the arm 39 may be used for raising the chimney cover 37. The actuating mechanism for raising the hinged chimney cover, clearly shown in Fig. 10, comprises a bell crank lever 27$^a$ shaped somewhat similarly to the bell crank lever 27 shown in Fig. 6 but provided additionally with a vertically disposed chimney cover raising arm 38.

The operation of the preferred form of my invention as disclosed in Figs. 1 through 6 is as follows: The chicks are placed on the wire screen 12 and the electrical circuit causes the electric light bulb 18 to burn. The slight amount of heat will be produced by the electric light bulb 18, and when the chicks are cold and deside artificial heat they will huddle around the outside of the heating member 15 to seek the heat produced by the electric light bulb 18, and on account of the tendency of the chicks to huddle towards a corner, they preferably will work their way around the base of the heating member 15 until they reach the corners formed by the intersection of the portion 30 with the heating member 15. Either before reaching the partition 30 or upon arriving there, the chicks will huddle against the outside of the heating member 15, and in so doing will move the semi-circular section 28 of the bell crank lever toward the heating member 15. This movement of the semi-circular section 28 will cause the switch operating arm 29 of the bell crank lever 27 to be forced upwardly, as clearly shown in Fig. 3, and this movement will cause the movable contact arm 22 of the switch 20 to come in contact with the fixed terminal 25.

In an electric heater, where the difference of potential between the mains is constant, the heat developed is inversely proportional to the resistance. When the movable contact arm 22 and the fixed terminal 25 are not in contact, the electric light bulb 18 and the electric heating element 19 are in series, the sum of their resistances is the total resistance, and some heat will be given off by the electric light bulb 18 and the electric heating element 19. When, however, the contact arm 22 is in contact with the fixed terminal 25 the conductor 24, the fixed terminal 25, the contact arm 22 and the conductor 23 will form a shunt around the electric light bulb 18. As the total resistance between the mains will be less than when the contact arm 22 is not in contact with the fixed terminal 25, the total current between the mains will be greater and more heat will be given off.

The electric heating element 19 will be caused to operate as long as one chick presses against the semi-circular section 28 of the bell crank lever 27. When the temperature within the heating member 15 is raised to or beyond the temperature desired by the chick operating the same the natural tendency of the chick will be to move away from the semicircular section 28 and in so doing the movable contact arm of the switch means 20 will be opened by gravity thus preventing the electric heating element 19 from producing appreciable heat.

The operation of the modified form of my invention, as illustrated in Figs. 7 through 10, is much the same. In this form of my invention, however, it is necessary to first insert glowing charcoals in the wire frame 35 in the chimney 33 so that a relatively small volume of heat will be generated therein. This heat, produced while the charcoal is thus glowing, corresponds to the heat generated by the electric light bulb in the preferred form of my invention, for attracting the chicks toward a source of heat. When a chick, in huddling toward the source of heat, presses against the semi-circular section 28ª of the bell crank lever 27ª, it will cause the chimney cover raising arm 38 of the bell crank lever 27 to be forced upwardly against the arm 39, thereby forcing the chimney cover 37 upwardly to the position shown by the dotted lines in Fig. 7.

Whenever the chimney cover 37 is thus raised, a draft will be created within the chimney 33 so that the charcoal 36 therein will produce relatively more heat. It is at once obvious that when a chick ceases to press against the semi-circular section 28ª, the chimney cover 37 will drop, thereby preventing a draft of air from circulating in the chimney, and such a shutting off of the draft will effectively decrease the amount of heat produced by the charcoal 36.

It will be apparent to those skilled in the art, that I have provided a simple and effective heat control means adaptable for use in brooders and operated by the chicks themselves, and it therefore will be understood that my invention accomplishes at least the principal objects of my invention. It further will be obvious that my invention contains objects, uses and advantages other than those specifically pointed out or mentioned herein, and that my invention may be variously changed, used or modified without departing from the spirit of my invention or sacrificing the advantages thereof. It further will be understood that the embodiment of my invention herein shown is illustrative only, and that my invention is not limited thereto.

Having thus described my invention, what I claim is:

1. In a chick brooder: a heating means for heating said brooder; and control means, operated by chicks for regulating said heating means.

2. In a chick brooder: a heating means for heating said brooder; and a bell crank lever, actuated by chicks, for controlling said heating means.

3. In a chick brooder; a heating means for heating said brooder; and a bell crank lever having an arm cooperating with said heating means and positioned near the bottom thereof, so as to be operated by the chicks to control said heating means; and a partition extending outwardly from said heating means and positioned between the two ends of said actuating arm for attracting the chicks thereto.

4. In a chick brooder: a heating means for heating said brooder; and control means operated by lateral pressure exerted by chicks for regulating said heating means.

5. In a chick brooder: a first heating means for heating said brooder; a second heating means for heating said brooder; and control means actuated by chicks for causing the said second heating means to supply additional heat.

6. In a chick brooder: a first electric heating means for heating said brooder; a second electric heating means for providing greater heat therein; and control means operated by chicks for causing said second electric heating means to supply said greater heat.

7. In a chick brooder; a combustion chamber for burning fuel for heating said brooder; means for regulating the combustion of said fuel in said combustion chamber; and control means operated by chicks for actuating said means.

8. In a chick brooder; a combustion chamber for burning fuel for heating the air in said brooder; draft means for regulating the combustion of said fuel in said combustion chamber; and control means operated by chicks for actuating said draft means.

9. In a chick brooder; a combustion chamber for burning fuel normally permitting a relatively slow combustion of fuel; means for appreciably increasing the rate of combustion in said combustion chamber; and control means operated by the chicks for operating said means.

10. In a chick brooder; a combustion chamber for burning fuel, normally permitting a relatively slow combustion of fuel; means for appreciably increasing the rate of combustion in said combustion chamber; and a lever operable by pressure exerted by the chicks to operate said means to appreciably increase the rate of combustion therein.

11. In a chick brooder; a combustion chamber for burning fuel normally permitting a slow rate of combustion therein; draft means for appreciably increasing the rate of combustion of the fuel therein; and a lever operable by the chicks to actuate said draft means when pressure is exerted thereon, and inoperable to so actuate said draft means when no pressure is exerted thereon.

12. In a poultry brooder: a first electric heating means; a second electric heating means; a first conductor means connecting said first and second heating means in series; a second conductor means adapted to connect said first and second heating means in parallel; switch means for opening and closing the circuit through said second conductor means; and means actuated by pressure exerted by chicks for closing said switch means and thereby connecting said first and second heating means in parallel while pressure is thus being exerted by chicks, said means being inoperative to actuate said switch means when no pressure is being exerted on said means by the chicks.

13. In a chick brooder: a first heating means for normally heating said brooder; a second heating means for providing additional heat to said brooder; and control means actuated by chicks for causing said second heating means to operate.

14. In a chick brooder: a first heating means for normally heating said brooder; a second heating means for providing additional heat to said brooder; and control means actuated by chicks for causing said second heating means to operate while said control means are maintained in operative position and inoperative to so control said second heating means when said control means are not maintained in operative position.

15. In a chick brooder, a heating means for supplying an amount of heat, and means adapted to be actuated by chicks when they seek warmth from said heating means for causing additional heat to be supplied.

16. In a chick brooder, a heating means for supplying an amount of heat, and means adapted to be actuated by chicks when they approach said heating means for causing additional heat to be supplied.

17. In a brooder, a heating means therefor including a pair of electric heating units connected in series with each other and a source of current and a circuit including a chick operated switch for shunting out one of said heating units to thereby increase the heat output from the other said unit.

In testimony whereof, I hereunto affix my signature.

ROBERT A. GORSUCH.